US009529502B2

(12) United States Patent
Prasad

(10) Patent No.: US 9,529,502 B2
(45) Date of Patent: Dec. 27, 2016

(54) INTEGRATED DISPENSING TERMINAL AND SYSTEMS AND METHODS FOR OPERATING

(71) Applicant: United Services Automobile Association (USAA), San Antonio, TX (US)

(72) Inventor: Bharat Prasad, San Antonio, TX (US)

(73) Assignee: UNITED SERVICES AUTOMOBILE ASSOCIATION, San Antonio, TX (US)

(*) Notice: Subject to any disclaimer, the term of this patent is extended or adjusted under 35 U.S.C. 154(b) by 161 days.

(21) Appl. No.: 13/920,548

(22) Filed: Jun. 18, 2013

(65) Prior Publication Data

US 2013/0339863 A1   Dec. 19, 2013

Related U.S. Application Data

(60) Provisional application No. 61/661,027, filed on Jun. 18, 2012.

(51) Int. Cl.
*G06F 3/048*   (2013.01)
*G06F 3/0484*   (2013.01)
*G06Q 20/18*   (2012.01)

(52) U.S. Cl.
CPC ............ *G06F 3/0484* (2013.01); *G06Q 20/18* (2013.01)

(58) Field of Classification Search
CPC .... H04L 29/06; H04L 29/08072; G06Q 10/10
USPC ....................................................... 715/733
See application file for complete search history.

(56) References Cited

U.S. PATENT DOCUMENTS

| | | | | |
|---|---|---|---|---|
| 5,868,179 A * | 2/1999 | Hartsell, Jr. | ............ | B67D 7/04 141/128 |
| 6,601,039 B1 * | 7/2003 | Kolls | ..................... | G06Q 10/10 705/14.23 |
| 7,520,430 B1 * | 4/2009 | Stewart et al. | ............... | 235/383 |
| 8,229,458 B2 * | 7/2012 | Busch | ..................... | H04W 4/02 370/338 |
| 8,266,075 B2 * | 9/2012 | Ambrosio | ................ | B60L 8/00 320/109 |
| 8,407,144 B2 * | 3/2013 | Roberts | ................ | G06F 21/316 705/17 |
| 8,412,631 B2 * | 4/2013 | Crofts | .................... | G06Q 40/00 705/26.1 |
| 8,566,197 B2 * | 10/2013 | Satyavolu et al. | ............. | 705/35 |
| 8,662,389 B2 * | 3/2014 | Dorsey et al. | ................ | 235/380 |
| 8,676,639 B2 * | 3/2014 | Perlman et al. | ............. | 705/14.1 |
| 9,111,277 B2 * | 8/2015 | Bryant, II | ............ | G06Q 20/401 |
| 9,111,278 B1 * | 8/2015 | Barton | ................... | G06Q 20/20 |
| 9,123,035 B2 * | 9/2015 | Penilla | ................... | G06Q 20/18 |
| 2002/0019781 A1 * | 2/2002 | Shooks et al. | .................. | 705/26 |
| 2006/0106678 A1 * | 5/2006 | Walker et al. | .................. | 705/26 |
| 2006/0161474 A1 * | 7/2006 | Diamond et al. | ............... | 705/14 |
| 2007/0260653 A1 * | 11/2007 | Jaffri et al. | .................... | 707/205 |
| 2009/0150211 A1 * | 6/2009 | Bayne | ............................ | 705/10 |
| 2010/0114783 A1 * | 5/2010 | Spolar | ............................ | 705/80 |
| 2011/0035294 A1 * | 2/2011 | Mizrah | ................... | G06F 21/33 705/26.42 |

(Continued)

*Primary Examiner* — David Phantana Angkool
(74) *Attorney, Agent, or Firm* — Baker & Hostetler LLP

(57) ABSTRACT

A user is enabled to initiate a user experience through use of a first device. Information is sent to the first device in support of the user experience. Input is receive from the user. One of termination of the user experience and transferring of the user experience to a second device is selected in response to receipt of input.

20 Claims, 4 Drawing Sheets

(56) References Cited

U.S. PATENT DOCUMENTS

| | | | |
|---|---|---|---|
| 2012/0259698 A1* | 10/2012 | Yurow | 705/14.51 |
| 2012/0296678 A1* | 11/2012 | Boot | G06Q 10/02 705/5 |
| 2013/0179254 A1* | 7/2013 | Joa et al. | 705/14.49 |
| 2013/0179255 A1* | 7/2013 | Joa et al. | 705/14.49 |
| 2016/0025506 A1* | 1/2016 | Penilla | G06Q 20/18 701/430 |

* cited by examiner

INTEGRATED DISPENSING TERMINAL AND SYSTEMS AND METHODS FOR OPERATING

BACKGROUND OF THE INVENTION

Self service electronic stands, self service kiosks, and dispensers are used to provide a variety of products and things to users. Such examples include automatic teller machines (ATMs), gasoline dispensers, and information kiosks. A distinction between these devices is in the time and focus that is necessary to complete a transaction or user experience.

A user of a gasoline dispenser is typically captive at the dispenser for the period of time it takes to fill the user's gas tank. Yet, during this time, the user's experience at the dispenser is relatively passive. The user does not have to focus attention on the dispenser until the filling operation is complete. At that point, the user has to reengage with the dispenser to insert the pump handle back in its cradle and obtain a receipt.

In contrast, an ATM user's experience is short, but focused. The user begins a transaction by entering a personal identification number (PIN) and responding to a number of prompts in order to receive cash. Many users do not want to conduct any business at the ATM beyond that of receiving cash. They want a quick and efficient transaction so that they can quickly go on their way.

It can be seen that one weakness of gasoline dispensers is that they require the customer to spend a relatively lengthy period of unproductive time while the tank fills. A weakness of ATMs and other informational kiosks that their core operation (e.g. dispensing cash) does not keep the user captive long enough for institutions to provide useful information and to sell other products and services to the user.

Therefore, what is needed are the systems and methods provided herein to more efficiently utilize the captive period of the gasoline dispenser user experience by integrating a focused user experience with it. More particularly, what is needed are systems and methods for operating an integrated dispensing terminal (IDT).

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

Figure 1:
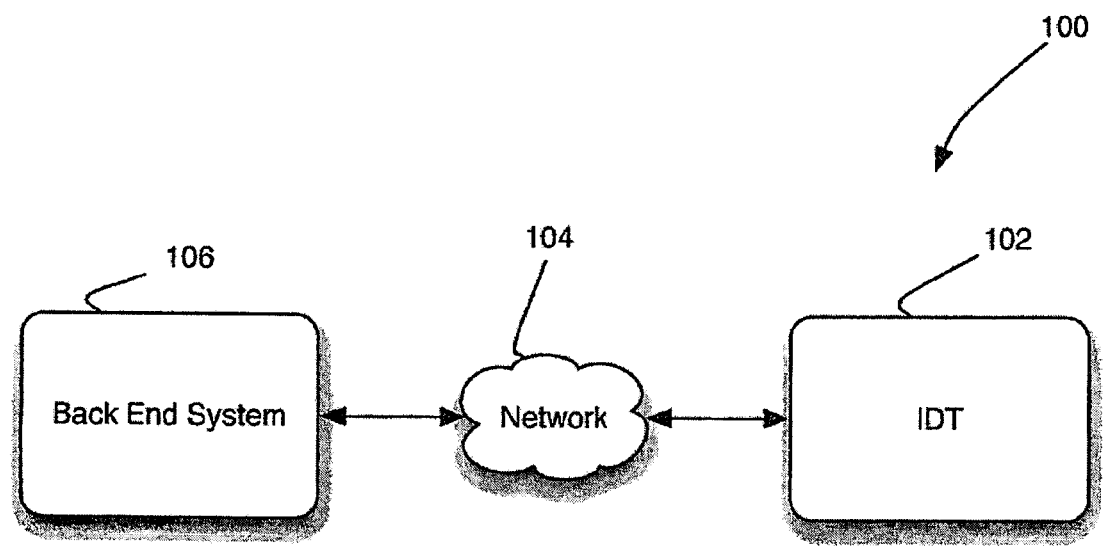
FIG. 1 depicts one embodiment of an integrated dispensing terminal system.

The present disclosure is directed to integrated dispenser systems and methods for operating the same, in the below illustrated embodiments. It is to be appreciated the subject invention is described below more fully with reference to the accompanying drawings, in which illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Referring to FIG. 1, an integrated dispenser system 100 is provided for exemplary purposes. In one example, system 100 includes at least one instance of an integrated dispenser terminal (IDT) 102, a network 104, and at least one instance of a back end system 106.

IDT 102, in one example, is the location where the user experiences described herein occur. In one example, IDT 102 is a gasoline dispenser. In another example, IDT 102 is an information kiosk. In another example, IDT 102 is an automated teller machine (ATM). It should be noted also that IDT 102 is not limited to the preceding examples and may comprise combinations of such functionality. For instance, IDT 102 may comprise a combination gasoline dispenser and ATM, or a combination gasoline dispenser, ATM and information (or self service) kiosk. A number of exemplary user experiences are described in U.S. Provisional Application 61/661,027 from which this application claims priority and which is hereby incorporated by reference in its entirety.

IDT 102 in one example communicates with back end systems 106 through network 104. It is to be appreciated that network 104 depicted in FIG. 1 may include a local area network (LAN) and/or a wide area network (WAN), but may also include other networks such as a personal area network (PAN). Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple devices may be used.

Finally, referring further to FIG. 1, system 100 includes one or more back end system 106. Back end system 106 in one example includes the electronic, manual, and physical systems that support the user experience provided at IDT 102. In one example, back end system 106 comprises a point of service (POS) terminal at gas station. In another example, back end system 106 comprises the servers and computers of an institution that does business or provides a user experience to users through IDT 102 (e.g. a financial institution, insurance company, etc.)

For instance, a financial institution could provide an ATM in IDT 102, in which case back end systems 106 would comprises the typical systems by which ATM fulfillment is achieved. Such functionality would include providing account verification, balance verification, validating user identity and providing account information, such as balances and statements. A financial institution could also provide advertising at ATMs and/or allow the user to open bank accounts, make deposits, and perform other account maintenance. Such functionality would be supported by back end system 106.

In another example, an insurance company could utilize IDT 102 to provide a self service kiosk to users. Such a kiosk could allow users to receive insurance quotes, obtain insurance, report accidents, and or check the status of claims. Such functionality would be supported by back end system 106.

It should be understood that each back end system 106 comprises one or more computing devices. A computing device generally includes at least one processor, at least one interface, and at least one memory device coupled via buses. Computing devices may be capable of being coupled together, coupled to peripheral devices, and input/output devices. Computing devices may be standalone devices, but are not limited to such. Each can be coupled to other devices in a distributed processing environment.

Figure 2:
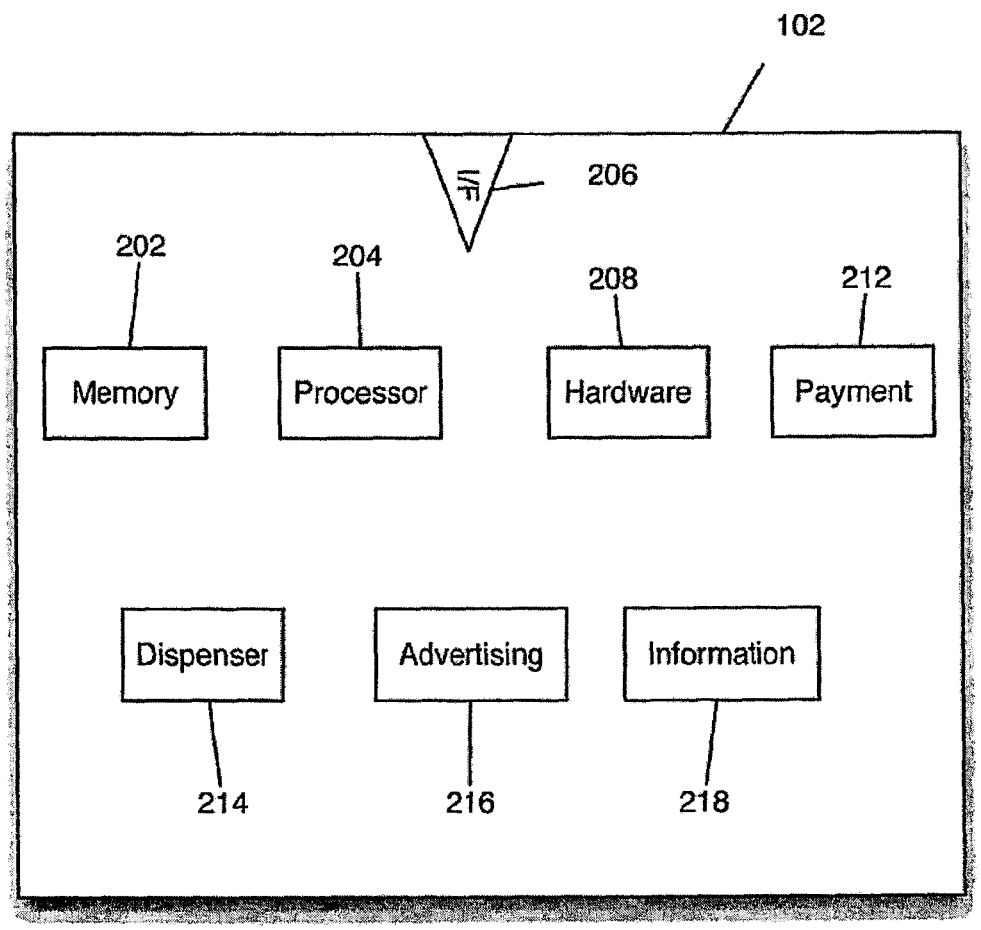
FIG. 2 is a functional block diagram of the integrated dispensing terminal shown in FIG. 1.

Referring to FIG. 2, a system diagram of IDT 102 is now provided for illustrative purposes. In one example, IDT 102 includes at least one memory 202, at least one processor 204, at least one data interface 206, and IDT hardware 208.

Memory 202 is a computer-readable medium encoded with a computer program. Memory 202 stores data and instructions that are readable and executable by processor 204 for controlling the operation of processor 204. Memory 202 may be implemented in a random access memory (RAM), volatile or non-volatile memory, solid state storage devices, magnetic devices, a hard drive, a read only memory (ROM), or a combination thereof.

Processor 204 is an electronic device configured of logic circuitry that responds to and executes instructions. The processor 204 may comprise more than one distinct processing device, for example to handle different functions within IDT 202. Processor 204 outputs results of execution of the methods described herein. Alternatively, processor 204 could direct the output to a remote device (not shown) via network 104.

Date interface 206 may include the mechanical, electrical, and signaling circuitry for communicating data over network 104. Interface 206 may be configured to transmit and/or receive data using a variety of different communication protocols and various network connections, e.g., wireless and wired/physical connections. However, it should be noted that the view used herein is merely for illustration. Interface 206 can further include an input device, such as a card reader, RFID reader, Q code reader, keyboard, a touch screen or a speech recognition subsystem, which enables a user (e.g., a candidate) to communicate information and command selections to processor 204. Interface 206 can also includes an output device such as a display screen, a speaker, Q code generator, a printer, etc. Interface 206 can further include an input device such as a touch screen, a mouse, track-ball, or joy stick, which allows the user to manipulate the display for communicating additional information and command selections to processor 104. Through utilization of interface 106, IDTs 102 are capable of being coupled together, coupled to peripheral devices, and/or input/output devices. IDT 102 is represented in the drawings as a stand-alone device, but is not limited to such. Each IDT 102 may be coupled to other IDTs 102 in a distributed processing environment.

IDT hardware 208 comprises the physical hardware necessary to produce a core user experience at IDT 102. For instance, if IDT 102 were to include gasoline dispenser functionality, IDT hardware 208 would include the physical pump hardware to pump gas into an automobile (pump, dispenser, cradle, etc.) If IDT 102 were to include ATM functionality, then IDT hardware 208 would include the physical ATM hardware needed to dispense cash at IDT 102. If IDT 102 were to include informational or self service kiosk functionality, then IDT hardware 208 would include the physical hardware needed to conduct business or provide information at IDT 102, e.g. printing devices, audiovisual devices, coupon dispensers, product dispensers, etc.

Referring further to FIG. 2, IDT 102 includes a number of engines to provide the functionality making up the user experiences at IDT 102. The term "engine" is used herein to denote a functional operation that may be embodied either as a stand-alone component or as an integrated configuration of a plurality of subordinate components. An engine may be implemented as a single module or as a plurality of modules that operate in cooperation with one another. An engine may be implemented as software stored in memory 204 and executing on processor 206 or in a distributed computing environment an engine could be located and executed across multiple locations. Further, an engine may also be implemented in any of hardware (e.g., electronic circuitry), firmware, software, or a combination thereof.

For exemplary purposes, IDT 102 includes payment engine 212, dispenser engine 214, advertising engine 216, and self service/information engine 218.

Payment engine 212 provides the functionality through which a user can pay for a product at IDT 102. In one example, payment engine 212 includes functionality to allow a user to pay through utilization of any combination of a credit card, debit card, loyalty card, gift card, promotional card, etc. In another example, payment engine 212 includes functionality to allow a user to pay through utilization of an application (e.g. thin client), operating on a mobile device, and communicating with IDT 102 through interface 206. In another example, payment engine 212 includes functionality for a user to pay (either before, after, or while the user is at IDT 102) through an application operating on a computer or mobile device and communicating with back end system 106. Payment engine 212 could then engage with back end system 106 to complete the transaction. For instance, payment engine 212 could ask back end system for approval to allow the user to "pay later" after the user has left IDT 102. Also, payment engine 212 could verify with back end system 106 that the user has paid, or that the user's account is up to date, prior to engaging in a dispensing operation.

Dispenser engine 214 provides the functionality for IDT 102 to dispense products to users on site. In one example, dispenser engine 214 includes gasoline dispenser functionality. Such functionality may include, but is not limited to, tabulating the amount of gasoline dispensed, safety mechanisms (e.g. automatic shut off), and sensing whether the pump handle is in its cradle. For instance, removal of the pump handle could serve as a prompt to begin a user experience, such as providing advertising, banking, or other self service activity. Insertion of the pump handle in a cradle could serve as a prompt to conclude a user experience or transfer the user experience session to another device.

In another example, dispenser engine 214 may include ATM functionality to provide cash, account balances, accept deposits, print statements, etc. at IDT 102. Dispenser engine 214 may also include virtual dispenser functionality. For instance, IDT 102 could distribute intangible items of value to user. Such intangible items may include rebates, reward points, virtual coupons, and the like. In one example, these intangible items can be provided directly from IDT 102 to user mobile devices, or alternatively these could be added to user accounts maintained by back end systems 106.

Advertising engine 216 controls advertising that is presented to a user through interface 206. Such advertising may include brand advertising in addition to product and service advertising. Advertising engine could also be used to offer promotions, sweepstakes, rebates, enroll the user in loyalty programs, and the like, which a user could sign up or accept at IDT 102 through user interface 206. Similarly, advertising engine 216 could offer users the ability to purchase products and services through interface 206.

Information engine 218 in one embodiment provides self service kiosk information to a user. For instance, a user my wish to inquire about the nearest branch of a financial institution, interest rates on loans, premium amounts for insurance policy, and other such information. Information engine 218 in one embodiment would control the receipt of user requests and the presentation of such information through interface 206.

In another example, information engine 218 may provide the users with information regarding the locations of a IDTs 102. For instance, the user could contact a location hosting at least one IDT 102 through the use of a thin client operating on a mobile device and determine whether or not and IDT 102 is free to dispense product. If the IDT 102 is free to dispense product, then the user could navigate to the station and dispense product, if not the user could proceed to another location. If there were an IDT 102 free to dispense product, the user could proceed to that location and/or reserve a free IDT 102 such that the user would not have to wait upon arrival at the IDT 102 location. As another alternative, the user may connect to back end systems 106 to conduct the proceeding interaction. As another example, the user may be presented with multiple locations having IDTs 102 and be able to select the location that is the most useful for the user.

Figure 3:
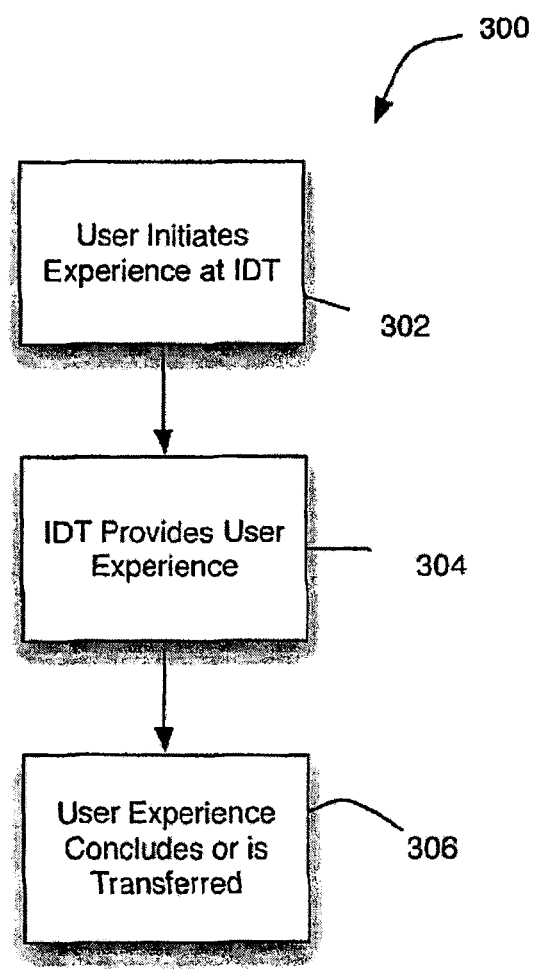
FIG. 3 is a flowchart illustrating one embodiment of a method for operating the system of FIG. 1.

Referring to FIG. 3 an exemplary flow diagram 300, shown for exemplary purposes, depicts operation of IDT 102. In step 302 a user initiates a user experience. In one example, the user initiates the experience at the IDT 102 through interface 206. This may be accomplished through multiple means, such as swiping a card through a card reader, entering data into a keyboard, and using voice or biometric communication. In another example, the user initiates a user experience through utilization of a mobile device. For instance, a user could use a client on a mobile device to initiate a Bluetooth or RFID communication that would initiate a user experience. In another example the user could initiate a communication remotely. In another instance, the user could use their mobile device or a networked computer to purchase gasoline from IDT 102 while the user is away from IDT 102. The user could then arrive at IDT 102 pump gasoline into their auto and leave because the gasoline was already purchased. Alternatively, the value of such gasoline could be deducted from the user's bank account which could be provided through fund transfer functionality provided on IDT 102.

Referring further to FIG. 3, in step 304, IDT 102 provides a user experience to the user. Such user experience may include a number of components. In one example, while pumping gasoline, the user could engage in activities, such as purchasing products or services, performing banking, receiving insurance quotes, planning travel, locating bank branches and/or ATMs, requesting customer service call backs, and reporting accidents.

In step 306, the user experience is concluded at IDT 102. In one example, the user experience could be absolutely terminated. In another example, the user experience may be transferred to another device, such as a mobile computer or a stand alone computer such that the user can resume their user experience remotely from the IDT 102. In a further example, the user experience session could be transferred to another IDT 102.

Figure 4:
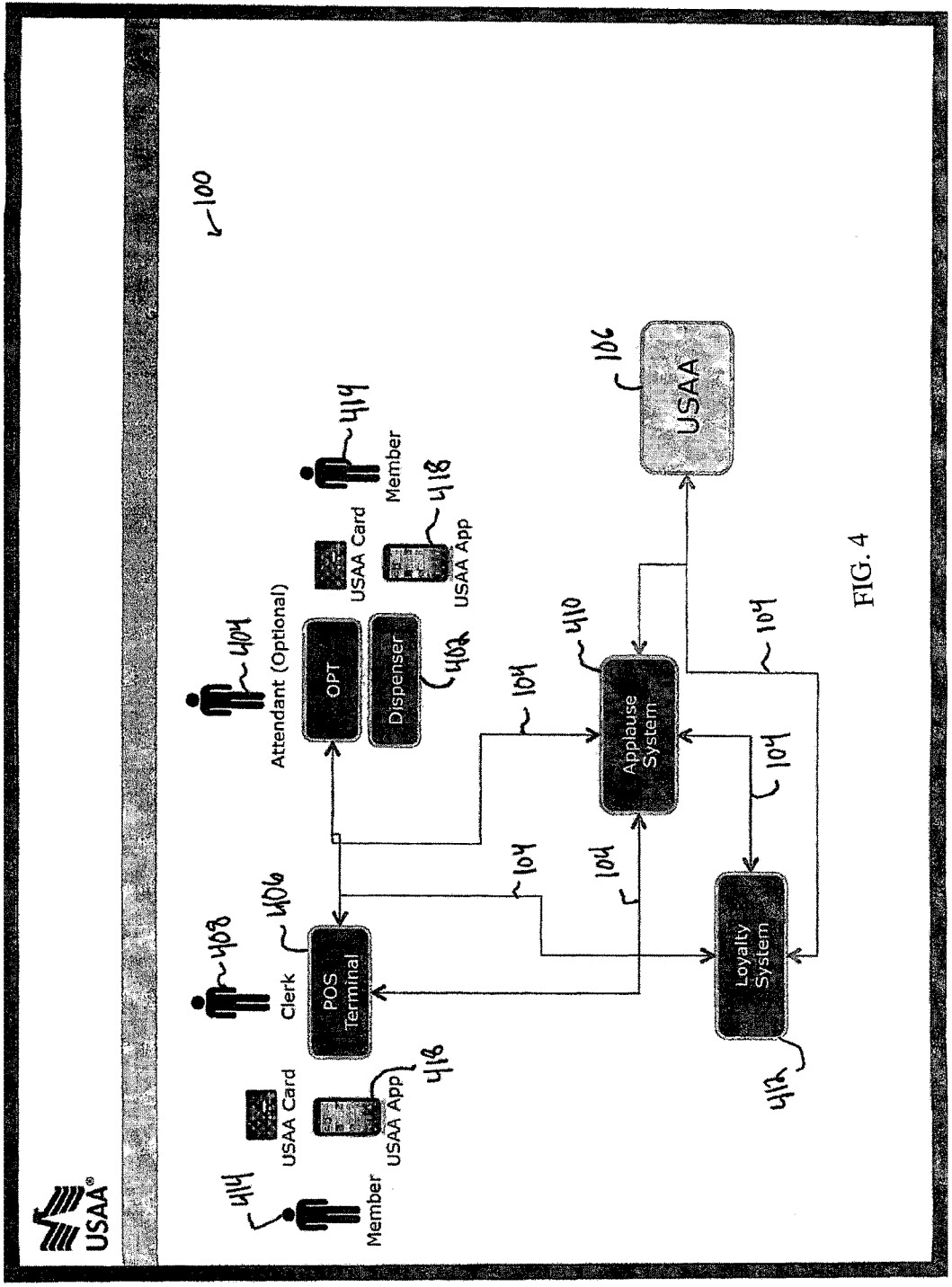
FIG. 4 depicts one embodiment of an integrated dispensing terminal system.

Referring to FIG. 4, an embodiment of system 100 is shown for illustrative purposes. In one example, system comprises an IDT 102 in the form of a gasoline dispenser 402, an optional attendant 404, a point of service (POS) terminal 406, a clerk 408, an advertising system engine 410, a loyalty system engine 412, a back end system 106, and one or more users 414. User 414 initiates a user experience through communicating either with POS terminal 406 or dispenser 402 (either directly or optionally through clerk). The user 414 initiates communication by directly inputting data through an interface (e.g. swiping card) or by utilizing a mobile device 418 to send information to dispenser 404 or POS 406. Once the user experience commences, one or more back end system 106 interact with advertising engine 410 and loyalty system engine 412 to advertise products to user 414, enroll user 414 in loyalty programs, and/or allow a user to redeem loyalty program points or incentives.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

The invention claimed is:

1. A computer implemented method executing on a device including at least one processor and at least one memory, the method comprising:
    initiating a user experience through use of a mobile device, wherein the user experience comprises determining a location of an integrated dispensing terminal, the integrated dispensing terminal comprising a gasoline dispenser;
    receiving, by the mobile device, an indication that a pump handle of the dispensing terminal has been removed from its cradle; and
    providing, by the mobile device, options of terminating the user experience and transferring the user experience to the integrated dispensing terminal.

2. The method of claim 1, wherein the user experience comprises a first user experience.

3. The method of claim 2, wherein the user experience comprises a second user experience.

4. The method of claim 3, wherein:
    the first user experience comprises providing a payment for gasoline to be dispensed from the integrated dispensing terminal.

5. The method of claim 4, wherein the second user experience comprises a banking transaction.

6. The method of claim 5, wherein the second user experience comprises an insurance transaction.

7. The method of claim 4, wherein the second user experience comprises facilitating, via the integrated dispensing terminal, a dispensing of the gasoline for which payment was provided.

8. The method of claim 3, wherein the first user experience occurs via the mobile device and the second user experience occurs via the integrated dispensing terminal.

9. The method of claim 8 wherein the first user experience comprises determining an availability of the integrated dispensing terminal.

10. The method of claim 1, further comprising providing virtual coupons to the mobile device from integrated dispensing terminal via a short-range wireless protocol.

11. The method of claim 9, wherein the first user experience comprises a purchase of a product via the integrated dispensing terminal.

12. The method of claim 11, wherein the product is a gift card.

13. A mobile device comprising:
    a processor;
    a memory coupled with the processor, the memory comprising executable instructions that when executed by the processor cause the processor to effectuate operations comprising:
        initiate a user experience, wherein the user experience comprises determining a location of an integrated dispensing terminal, the integrated dispensing terminal comprising a gasoline dispenser;
        receive an indication that a pump handle of the dispensing terminal has been removed from its cradle; and
        provide options of terminating the user experience and transferring the user experience to the integrated dispensing terminal.

14. The mobile device of claim 13, wherein the user experience comprises a first user experience.

15. The mobile device of claim 14, wherein the user experience comprises a second user experience.

16. The mobile device of claim 15, wherein the first user experience comprises providing a payment for gasoline to be dispensed from the integrated dispensing terminal.

17. The mobile device of claim 16, wherein the second user experience comprises a banking transaction.

18. The mobile device of claim 17, wherein the second user experience comprises an insurance transaction.

19. The mobile device of claim 15, wherein the first user experience comprises determining an availability of the integrated dispensing terminal.

20. The mobile device of claim 13, wherein the instructions further comprise transferring the user experience to an integrated dispensing terminal.

* * * * *